United States Patent
Avraham et al.

(10) Patent No.: US 7,886,353 B2
(45) Date of Patent: Feb. 8, 2011

(54) ACCESSING A USB HOST CONTROLLER SECURITY EXTENSION USING A HCD PROXY

(75) Inventors: Idan Avraham, Seattle, WA (US); John C. Dunn, Issaquah, WA (US); Constantyn Koeman, Kirkland, WA (US); Mark Williams, Kirkland, WA (US); David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1320 days.

(21) Appl. No.: 11/090,547

(22) Filed: Mar. 25, 2005

(65) Prior Publication Data

US 2006/0218409 A1 Sep. 28, 2006

(51) Int. Cl.
*G06F 9/00* (2006.01)
*G06F 15/16* (2006.01)

(52) U.S. Cl. ............................ 726/14; 726/13; 726/12; 713/189

(58) Field of Classification Search ................ 713/189; 726/12, 13, 14
See application file for complete search history.

(56) References Cited

U.S. PATENT DOCUMENTS

| | | | |
|---|---|---|---|
| 5,748,888 A | 5/1998 | Angelo et al. | |
| 7,213,096 B2 * | 5/2007 | Keys et al | 710/313 |
| 7,290,072 B2 * | 10/2007 | Quraishi et al. | 710/105 |
| 2002/0143921 A1 | 10/2002 | Stephan | |
| 2004/0003262 A1 | 1/2004 | England et al. | 713/189 |
| 2004/0250087 A1 | 12/2004 | Ray et al. | 713/189 |
| 2006/0075259 A1 * | 4/2006 | Bajikar et al. | 713/189 |
| 2006/0218320 A1 | 9/2006 | Avraham et al. | |

OTHER PUBLICATIONS

U.S. Appl. No. 11/090,582: Non-Final Rejection, Mar. 31, 2009, 21 pages.
U.S. Appl. No. 11/090,582: Notice of Allowance, Mar. 15, 2010, 18 pages.
U.S. Appl. No. 11/090,582: Notice of Allowance, Nov. 16, 2009, 16 pages.

* cited by examiner

*Primary Examiner*—Christopher J Brown
(74) *Attorney, Agent, or Firm*—Woodcock Washburn LLP

(57) ABSTRACT

Systems and methods for enabling trusted software to monitor and control USB traffic associated with a security extension of a host controller and devices in a USB topology is disclosed. A host controller proxy receives USB-related data from a host controller driver, determines whether the data is of a security interest, and if so, sends the data to a driver for a security extension executing in the trusted execution environment. Likewise, after software executing in the trusted execution environment evaluates and appropriately addresses data sent by the HCD proxy or data retrieved from a hardware security extension, the HCD proxy receives data from the trusted execution environment for further dissemination.

19 Claims, 5 Drawing Sheets

ACCESSING A USB HOST CONTROLLER SECURITY EXTENSION USING A HCD PROXY

RELATED APPLICATIONS

This application is related to U.S. patent application Ser. No. 11/090,547, entitled "Using a USB Host Controller Security Extension for Controlling Changes in and Auditing USB Topology" filed herewith and incorporated by reference in its entirety.

FIELD OF THE INVENTION

The invention generally relates to the field of the universal serial bus (USB) and specifically to the security of data associated with the USB.

BACKGROUND OF THE INVENTION

Attacks to the security of a computer system may take a form of attacking data associated with peripheral devices that are connected to the computer system through a universal serial bus (USB). Such peripheral devices include digital telephone lines, modems, mice, printers, scanners, game controllers, keyboards, and other peripheral devices. For example, snooping attacks may be directed to intercepting data such as a credit card number inputted through a keyboard. Another attack may substitute a device of the attacker's choice with a computer system's keyboard and deceive the system into communicating with the device as if it was the keyboard.

Computer systems may include a trusted execution environment that includes trusted software. Trusted software is executed only in the trusted execution environment through use of processor support such that the software is not vulnerable to attacks. The trusted execution environment may be isolated or partitioned from the execution of other software on, for example, an operating system of a computer system. Such isolation may help ensure the security of certain operations performed on the computer. In a computer system with a trusted execution environment, it may be desirable to secure certain USB peripheral devices to protect against attacks on or associated with the peripheral devices.

Peripheral USB devices are connected to and communicate with a computer system, that is, a "host," through a host controller. Peripheral USB devices send data to and receive data from the host through the host controller. Program code controlling the operation of the host controller, that is, the host controller driver (HCD), may reside on the host outside of the trusted execution environment. The host controller driver receives data from program code controlling or associated with each peripheral device. Such program code may be the device driver for each peripheral device. The host controller driver sends data to the appropriate device through the host controller. The host controller driver makes sure that data sent to the host controller from a peripheral is delivered to the appropriate device driver.

For certain peripheral devices called trusted devices, data associated with the USB devices may be diverted to the trusted execution environment. Trusted, that is, secure, USB devices send data to and receive data from the trusted execution environment. Data sent by a trusted device, such as a trusted keyboard, may be diverted by secure hardware located within the host controller for processing in the trusted execution environment. This secure hardware is referred to as a "security extension" (SE). Likewise, data sent to a trusted USB device may be sent from the trusted execution environment, thus ensuring that the trusted device remains secure. Some of the peripheral devices may not be of a primary security concern and therefore data associated with such devices may not be sent via the trusted execution environment.

The hardware SE on the host controller may not be accessible for program code running outside the trusted execution environment on the host. For example, the HCD may be executed outside the trusted execution environment, and therefore may be unable to control security related activity that takes place when hardware is programmed to secure certain peripheral devices. Trusted software executing in the trusted execution environment may likewise be unable to use the host controller driver to monitor or control USB traffic associated with the SE and may otherwise be unable to control the host controller. Additionally, USB device drivers executing outside the trusted execution environment may control USB devices that were originally not trusted but that became trusted. These device drivers, however, may be unable to access the security extension.

Therefore, there is a need for methods and apparatus to enable trusted software to monitor and control USB traffic associated with the SE and the devices in the USB topology.

SUMMARY OF THE INVENTION

The invention provides systems and methods for enabling trusted software to monitor and control USB traffic associated with a host controller security extension (SE) and devices in a USB topology. The systems and methods include a host controller proxy for receiving USB-related data from a host controller driver (HCD), determining whether the data is of a security interest, and if so, sending the data to a driver for a security extension executing in the trusted execution environment. Likewise, after software executing in the trusted execution environment evaluates and appropriately addresses data sent by the HCD proxy or data retrieved from a security extension, the HCD proxy receives data from the trusted execution environment for further dissemination.

The HCD proxy thus enables trusted software such as a driver of a SE to monitor and control untrusted software without degrading the security nature of a system's trusted execution environment. The HCD proxy, for example, intercepts any data sent by a USB device driver that may be of a security concern and diverts it to the trusted execution environment for evaluation. Trusted software then can configure the SE to allow or prevent the transmission of data consistent with a security policy. Thus, the invention includes an interface in a manner such that the information passed between the HCD and the security extension software module does not increase the vulnerability of the security model. Additionally, the HCD proxy allows the HCD to continue servicing the device drivers that are already loaded for the trusted USB devices even though data generated by these devices is no longer available for the corresponding device drivers.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Example Computing Environment

Figure 1:
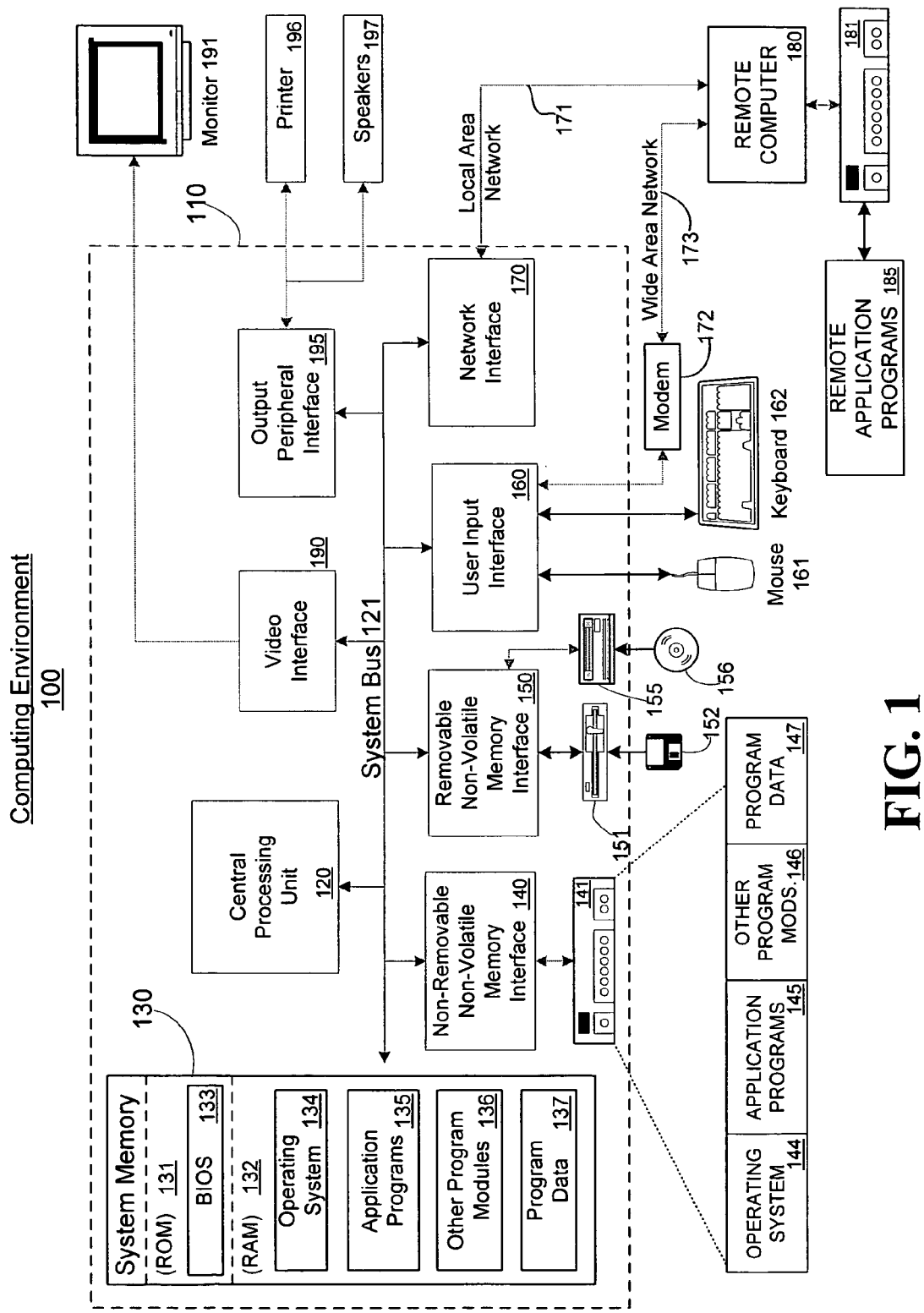
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor. The term "untrusted program code" or "untrusted code" refers to any set of instructions that are executed or otherwise processed by a processor outside of a trusted execution environment. The term "device driver" refers to any program code that at least in part controls a component of a computer system, such as a USB device, or facilitates communication of data between a component and other devices or program code of a computer system. The term "trusted execution environment" refers to an environment comprising trusted program code that is isolated from other code located outside of the trusted execution environment and to which security policies are applied to provide secure execution of the program code.

The term "universal serial bus" or "USB" refers to a cable bus that supports data exchange between a host computer and a wide range of accessible peripheral devices or functions. "USB device," "USB function," "USB peripheral," or "peripheral" refers to devices that may be attached or that are attached to a USB. USB devices, functions, or peripherals share USB bandwidth through a host-scheduled, token-based protocol. The USB allows peripherals to be attached, configured, used, and detached while the host and other peripherals are in operation.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
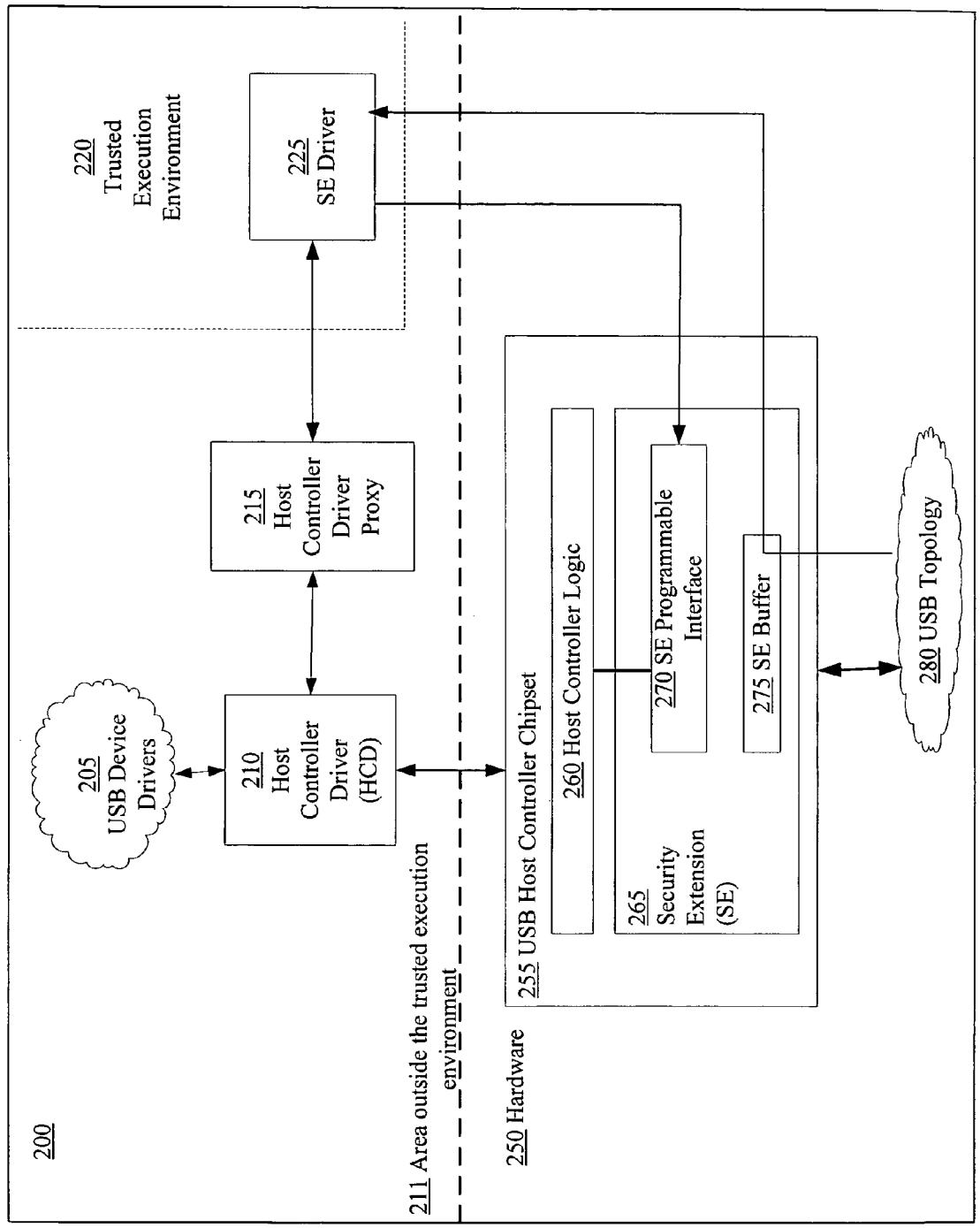
FIG. 2 is block diagram of a system for accessing a USB host controller security extension using a HCD proxy, according to the invention.

FIG. 2 is block diagram of a system 200 for accessing a USB host controller security extension using a HCD proxy, according to the invention. The system 200 may be the computer 110 of FIG. 1 and may generally be divided into USB related hardware 250, a trusted execution environment 220, and an area outside of the trusted execution environment 211.

The hardware 250 includes a USB host controller chipset 255 with a hardware security extension (SE) 265, and a USB topology 280. The USB host controller chipset 255 is a hardware component to which USB devices are or may be attached. The USB host controller chipset 255 includes several ports that are referred to as root ports or root hub ports. USB related data sent from, for example, a USB device driver to an associated USB device in the USB topology 280 is delivered by the USB host controller chipset 255. Likewise data sent from a USB device in the USB topology 280 to its device driver is delivered by or via the USB host controller chipset 255.

The USB topology 280 includes USB devices that are connected downstream from the USB host controller chipset 255. The USB topology 280 may also be referred to as a bus topology. The USB topology 280 contains two types of USB devices, USB hubs and USB functions. USB hubs are devices that have ports to which either hubs or functions may be connected. A USB function is a device that provides certain functionality, such as a web camera or a printer. The USB topology 280 is rooted at ports on the USB host controller chipset 255. These ports are grouped together and are generally referred to as a root hub.

The SE 265 is a hardware device located on the USB host controller chipset 255 or between the USB host controller chipset 255 and the USB topology 280. The SE 265 monitors the communication traffic between devices in the USB topology 280 and the USB host controller chipset 255. The host controller chipset 255 is not aware of the existence of the SE 265 and therefore, the SE 265 may block USB packets that the USB host controller chipset 255 sends to USB devices in the USB topology 280 as well as block or divert data that a USB device sends to the USB host controller chipset 255.

The SE 265 may include an SE buffer 275, which is a memory region to which data coming from a USB device in the USB topology 280 can be diverted. Because the SE buffer 275 may only accessible by trusted software executing in the trusted execution environment 220, software running outside of the trusted execution environment 220 may not be able to access USB data sent to the SE buffer 275. Also, software running outside the trusted execution environment 220 may not be able to insert USB data into the SE buffer 275 to deceive the system 200 into believing that data was actually generated by a trusted input device.

The SE 265 additionally may include an SE programmable interface 270. Trusted software thus may be able to control the operation of the SE 265 through the programmable interface 270. Trusted software may instruct the SE 265 to dispose of data sent from or to the USB topology 280 in a particular manner. For example, trusted software may instruct the SE 265 through the SE programmable interface 270 to copy contents of a data phase of a command to the SE buffer 275 when the command is sent to a particular device address. Thus the trusted software may be able to read a device's USB descriptor and be certain that data has not be been, for example, tampered with, snooped, or spoofed.

The area outside of the trusted execution environment 211 may generally include software for controlling and communicating with the USB-related hardware 250. The area outside of the trusted execution environment 211 may include a host controller driver (HCD) 210, USB device drivers 205, and a host controller proxy 215. The HCD 210 is a software module responsible for interfacing with the USB host controller chipset 255. The HCD 210 communicates with the USB host controller chipset 255 through a hardware interface exposed by the USB host controller chipset 255. The HCD 210 also exposes an interface that drivers running on the system 200 can utilize for communicating with their corresponding devices.

Each of the USB devices in the USB topology 280 typically is controlled by program code executed on the system 200. The program code may be grouped into software modules, and each software module may control a USB device. The software modules are the USB device drivers 205. Different USB devices are controlled by different USB device drivers. For example, a hub driver is a software module controlling a USB hub. For the most part, these drivers are loaded such that the driver hierarchy matches the USB topology 280. Therefore, as USB devices are added to or removed, the appropriate drivers are loaded onto the system 200 or unloaded from the system 200.

The HCD proxy 215 communicates with the HCD 210 and executes in the area outside the trusted execution environment 211. The HCD proxy 215 includes a software module that interacts with both an SE driver 225 located in the trusted execution environment 220 and the HCD 210, and delivers information back and forth between the two software components. The SE 265 is programmed (through the SE programmable interface 270) based in part on information managed by the HCD 210.

The HCD proxy 215 provides an ability for trusted software executing in the trusted execution environment 220, such as the SE driver, to communicate with the software that is not trusted (e.g., the HCD 210) without detrimentally affecting the security of the trusted execution environment 220 or program code executed therein. The SE driver 225 in the trusted execution environment 220 obtains information about the USB topology 280 and USB traffic generated by the USB device drivers 205. The USB topology 280 as well as related requests from the USB device drivers 205 are managed by the HCD 210, and therefore having the HCD proxy 215 to interact with the HCD 210 and with the SE driver 225 makes it possible for the latter to set the hardware of the SE 265 based on USB information (e.g., device addresses, endpoint numbers) managed by the HCD 210.

Because the HCD 210 has limited or no access to the SE 265 and therefore does not control which input devices in the USB topology 280 to secure, the HCD 210 is not aware that input data generated by certain devices in the USB topology 280 are diverted to the SE buffer 275. This means that the USB device drivers 205 that the HCD 210 previously loaded to manage non-secure devices that are subsequently secured are still using the HCD 210. In order to make sure that the USB device drivers 205 of trusted input devices in the topology 280 get an appropriate response from the secure devices, the HCD proxy 215 monitors requests coming from the USB device drivers 205. Certain requests are passed directly back to the HCD 210 so that they can be sent to the device in the USB topology 280 while other requests are passed to the SE driver 225 for further examination. The SE driver 225 can configure the SE 265 before the request is sent to the device.

The trusted execution environment 220 may be isolated from the area outside of the trusted execution environment 211 for security related reasons. Security policies are implemented or applied to program code, memory, and any other entities within the trusted execution environment 220 to ensure that it remains isolated and secure. The isolation of software running in the trusted execution environment 220 is provided using processor support so that the software is protected from software attacks. Software running in the trusted execution environment 220 is generally referred to as trusted software.

One piece of trusted software within the trusted execution environment is the SE driver 225. The SE Driver 225 is a software module for controlling the SE 265. The SE driver 225 runs in the trusted execution environment 220 and therefore has access to the SE programmable interface 270. Additionally, the SE driver 225 interacts with the HCD proxy 215 in order to decide how to program the hardware of the SE 265.

Figure 3:
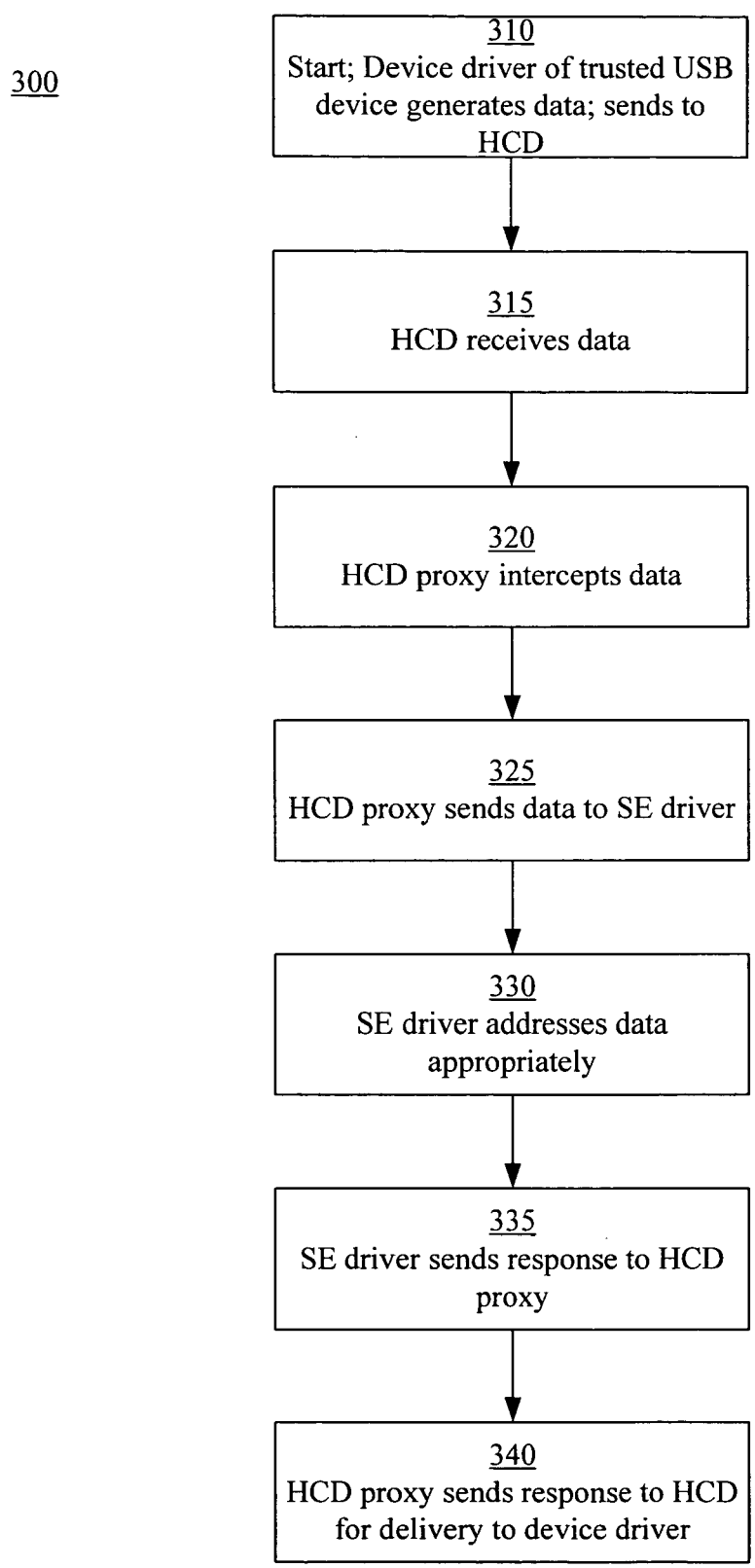
FIG. 3 is a flow diagram of an example method for accessing a USB host controller security extension using a HCD proxy, according to the invention.

FIG. 3 is a flow diagram of an example method 300 for accessing a USB host controller security extension using a HCD proxy, according to the invention. The method 300 commences at step 310 with a device driver of a USB device generating data and sending the data to a HCD. The data may be, for example, a transfer request that the device driver sends to obtain data from the trusted USB device. Alternatively, the data may be a control command or a "setup" packet to configure the trusted USB device.

At step 315, the HCD receives the data. Typically at this point, the HCD appropriately deals with the data by either, for example, queuing a transfer or sending a control command to the host controller. According to the invention, however, the HCD proxy intercepts the data at step 320. The HCD proxy is therefore in a position to deal with the data by sending it back to the HCD if it is not, in a security sense, interesting. Alternatively, the HCD proxy may send the data, at step 325, to the SE driver in the trusted execution environment for evaluation and appropriate processing. For example, if the data is a transfer request, then the HCD proxy may queue it and, when the HCD proxy learns that data associated with the transfer request has been generated by the USB device, the HCD proxy may send the transfer request or other data to the trusted execution environment. The HCD proxy may send the data to the SE driver, telling the SE driver to pull data from the SE buffer of the SE. If, also for example, the data is a control command, then the HCD proxy may send the control command to the SE driver for appropriate evaluation and disposition.

At step 330, the SE driver facilitates the evaluation of the data and performs any tasks or functions as appropriate. At step 335, the SE driver sends a response to the HCD proxy. The response may be, for example, data that the device driver requested by issuing a transfer request. The data may be a response to a command control, communicating to the device driver that the device has been appropriately configured. At step 340, the HCD proxy sends the data received from the SE driver to the HCD for appropriate disposition by the HCD.

Figure 4:
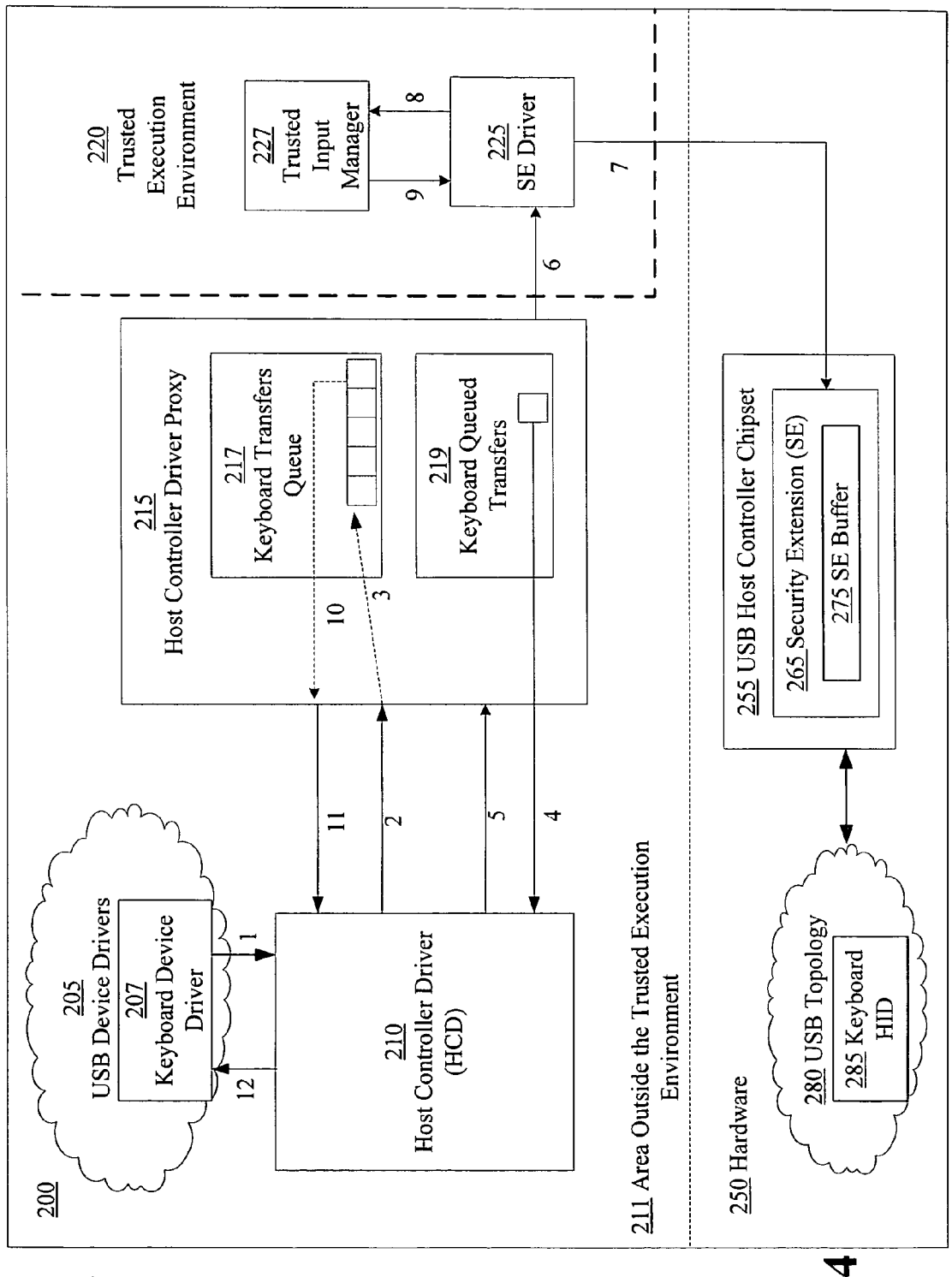
FIG. 4 is a sequence diagram of an example method for accessing a USB host controller security extension using a HCD proxy, according to the invention.

FIG. 4 is a sequence diagram of an example method 400 for accessing a USB host controller security extension using a HCD proxy, according to the invention. The method 400 is shown on the system 200 and includes, in numeric order, the steps of a data flow model for processing human interface device (HID) input reports for a keyboard 285 in the USB topology 280. The system 200 includes the addition of a keyboard device driver 207 included with the USB device drivers 205.

An input report generally describes a device's state. A HID input report or HID report is an input report generated by a HID such as the keyboard 285. When a HID device driver parses an input report, it can infer which input event should be reported to the operating system 210. For example, when a keyboard HID input report indicates that none of the keys of the keyboard 285 is pressed, the keyboard device driver 207 may communicate to the operating system 210 that any key previously pressed has been released.

It will be recognized that, in order to establish a trusted input path between a user of the system 200 and the system 200, it may be required to differentiate USB input devices (e.g., a keyboard or mouse) from other devices (e.g., a printer) in the USB topology 280. Once the input devices are tracked, the SE 265 may be programmed to divert input data generated by the input devices to the SE buffer 275 of the SE 265 so that an adversary may be prevented from obtaining the input data. When the SE 265 is programmed to divert the data of an input device to the SE buffer 275, that device may be referred to as being a trusted input device.

When a USB HID is a marked "trusted" by the SE driver 225, the HID input reports generated by the device are diverted by the SE 265 to the SE buffer 275. As noted, only software running within the trusted execution environment 220 has access to the SE buffer 275. The USB device driver managing the device that was marked "trusted" typically is not aware of the transition from "untrusted" to "trusted" and therefore, the driver continues polling the HID device by issuing requests for USB transfers. In order to read data from a HID device, its USB device driver initiates a USB transfer. The transfer type depends on the HID device endpoint's type (e.g., bulk, interrupt.). For example, when the keyboard device driver 207 wants to read a HID input report from the keyboard 285, it uses the HCD 210 to initiate an appropriate USB transfer request. USB input devices generally report input data using an interrupt endpoint.

A task of the HCD proxy 215 is to manage these transfers in a way that keeps the USB device constantly polled. Also, there are cases in which the HID input reports are sent back to the USB device driver. The HCD proxy 215 may use previously issued transfers in order to satisfy the driver's request. FIG. 4 shows a sequence of events when handling a HID Report generated by the trusted USB keyboard 285. Of course, embodiments of the invention may be equally applicable for other types of data and other types of devices in a USB topology such as the USB topology 280.

At step 1, the keyboard device driver 207 polls the keyboard 285 in order to read HID reports from the keyboard 285. The keyboard device driver 207 polls the keyboard 285 by sending a USB transfer request to the keyboard 285 through the HCD 210. The USB transfer may be directed at a specific endpoint on the device. The HCD 210 passes all USB transfers, including the transfer from the keyboard device driver 207, to the HCD proxy 215 at step 2. The HCD proxy 215 decides what should be done with each transfer. It will be understood that the HCD proxy 215 receives all USB transfers, including those that are not directed to a trusted input device in the USB topology 280.

When the HCD proxy 215 receives the USB transfer, it determines whether the USB device to which the transfer is queued is a trusted input device. If the input device is not a trusted input device, then the HCD proxy sends the transfer back to the HCD for normal, non-secure processing. The keyboard 285, however, is in this example a trusted input device and has previously been marked as such in the security extension 265 by the SE driver 225. The HCD proxy 215 thus will be responsible for sending the USB transfer request to the keyboard 285. The HCD proxy 215 later will notify the HCD 210 when the transfer is completed. At step 3, the HCD proxy 215 will place the transfer in a keyboard transfers queue 217 for the keyboard 285.

In order to make sure the keyboard 285 is constantly polled, the HCD proxy 215 may, at step 4, queue two transfers to the keyboard 285 and place these queues in a keyboard queued transfers 219. Note that these transfers are not the same transfers that are queued in the control transfers queue 217 at step 3. Two transfers may be created at step 4 to ensure that, when one transfer is completed by the keyboard 285, there is still a pending transfer. It will be understood that there may be more than two transfers queued by the keyboard device driver 207 and passed on to the HCD proxy 215, and therefore step 4 may not necessarily follow step 3. Additionally, the HCD proxy 215 calls into the HCD 210 to queue these transfers as the HCD 210 may be the sole software module interfacing with the USB host controller chipset 255.

At step 5, the keyboard 285 generates data such as when a user presses a key on the keyboard 285, causing the keyboard 285 to generate a HID report. The SE 265 diverts the HID report to the SE buffer 275. In addition, the SE 265 zero length packet to the USB host controller chipset 255. This may be necessary to trigger the previously queued transfer to complete. When that happens, the HCD proxy 215 immediately resubmits a transfer to the same endpoint to make sure the device continues to be polled. Because the SE buffer includes data that should be fetched and processed in the trusted execution environment 220, at step 6, the HCD proxy 215 instructs the SE driver 225 to access the SE buffer 275 and read the HID input report.

At step 7, after the SE driver 225 receives the notification from the HCD proxy 215, it accesses the SE buffer 275 and fetches any HID input report that the SE 265 diverted from any trusted input device, including the keyboard 285. It will be understood that the SE buffer 275 may be shared between all trusted input devices in the USB topology 280. Therefore, when the SE driver 225 is notified that there is data associated with one device, it might find HID input reports from more than just the keyboard 285.

Each HID input report, including one or more HID reports generated by the keyboard 285 that the SE driver 225 fetches from the SE buffer 275 is sent, at step 8, to a trusted input manager 220 located in the trusted execution environment 220. The trusted input manager is a software module responsible for parsing HID input reports and routing them to the appropriate entity. In some cases, the trusted input manager 220 may decide to return the HID input report to the operating system 210 so that it can be processed by the appropriate device driver.

At step 9, the trusted input manager 227 decides what to do with the HID input report generated by the keyboard 285 (as well as other input reports). The trusted input manager 227 instructs the SE driver 225 to send the HID report generated by the keyboard 285 to the operating system 210, and the SE driver 225 sends the report to the HCD proxy 215.

The HCD proxy 215 prepares to send the HID input report generated by the keyboard 285 to the HCD 210 at step 10. The HCD proxy 215 removes a USB transfer from the keyboard transfers queue 217 and places the HID input report in the transfer's buffer. At step 11, the HCD proxy 215 completes the previously queued transfer, and at step 12, the HCD 210 receives the USB transfer and completes the corresponding request that was previously sent by the keyboard device driver 207.

Once the request sent by the keyboard device driver 207 completes, the keyboard device driver 207 may resubmit a similar request which will, in turn, restart the sequence of events of the method 400. It should be understood that the data flow of the method 200 takes place after the SE 225 driver marks a device in the security extension 265 from the USB topology 280 as "trusted." If the device is marked "trusted" after the HCD 210 received USB transfer requests from a device driver, the HCD 210 may abort these requests and pass them to the HCD proxy 215 so that they can be appropriately processed using the method 400.

Figure 5:
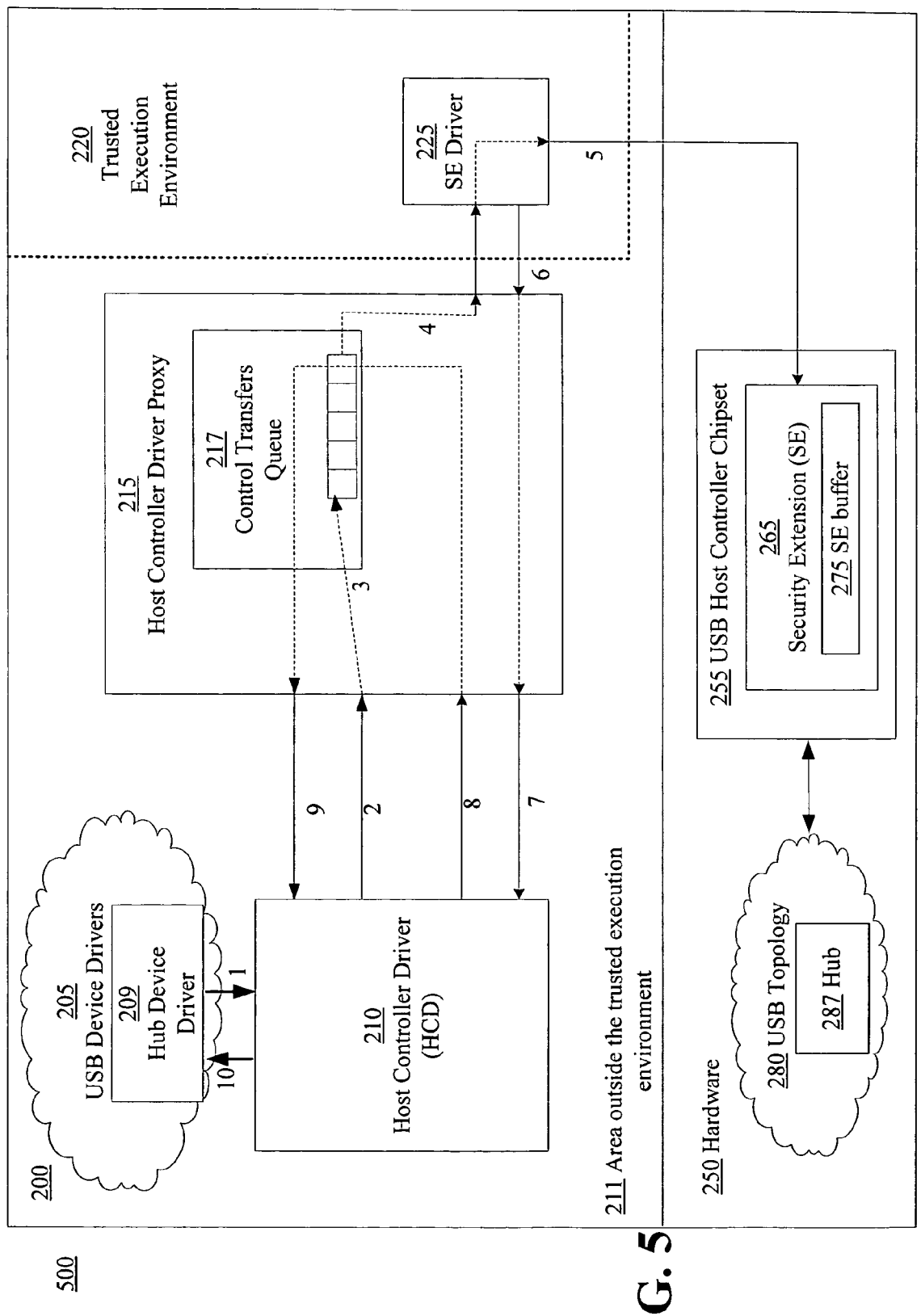
FIG. 5 is a sequence diagram of an alternative example method for accessing a USB host controller security extension using a HCD proxy, according to the invention.

FIG. 5 is a sequence diagram of an alternative example method 500 for accessing a USB host controller security extension using a HCD proxy, according to the invention. Before an input device is deemed a "trusted input device," the SE driver 225 may obtain information about the device using the SE 265. The HCD proxy 215 may facilitate this process by monitoring USB control commands that the device drivers 205 send to their respective devices. The HCD proxy 215 can inform the SE driver 225 of certain commands that might have an impact on the hardware settings of the SE 265. For example, the SE driver 225 may need to know when a Port_Reset command is sent to a hub device in the USB topology 280, as a USB device connected to that port may be an input device that needs to be marked "trusted." The method 500 is an example method for completing this task.

For example purposes, a hub device driver 209 sends a USB control command to its hub 287 in the USB topology 280. A USB control command, that is, a setup command, is used to configure a USB device such as the hub 287. The hub device driver 209 uses the interface of the HCD 210 to send the command. Each USB device in the USB topology 280 may include a control endpoint (endpoint 0) which is the destination of the control commands sent to the device. This endpoint may also be referred to as the default pipe. For example, when the hub device driver 209 wants to reset one of its hub ports on the hub 287, it sends a Port_Reset command to the hub 287.

In order to configure its hub 287, the hub device driver 209 instructs the HCD 210 to send a "setup" packet to the hub 287 at step 1. The hub device driver 209 completes step 1 by requesting a USB control transfer from the HCD 210. At step 2, instead of sending the USB control transfer immediately, the HCD 210 passes the request to the HCD proxy 215. The HCD proxy may receive all the USB control transfers, including those that the SE driver 225 does not need to examine. In the example method 500, the USB control transfer is one that the SE driver 210 examines. The HCD proxy may send the command on to be delivered to the hub 287 after the SE driver 225 processes it.

At step 3, the HCD Proxy places the USB control transfer in a control transfers queue 217, with all pending USB control transfers. It will be understood that the queue 217 may be global and not device specific. A USB control transfer is fetched from the queue 217 at step 4 and sent to the SE driver 225 so that SE driver 225 can scrutinize the nature of the command that the hub device driver 209 sent to its hub 287. Upon receiving the USB control transfer request from the HCD proxy 215, the SE driver 225 checks the contents of the setup packet and acts accordingly to update its internal state. If needed, the SE driver 225 also adjusts the SE hardware settings of the SE 265 so that the command can be properly sent to the hub 287 through the USB host controller chipset 255. This is performed at step 5.

At step 6, the SE driver 225 notifies the HCD proxy 215 that the command may be sent to the hub 287. The HCD proxy 215 sends the USB control command to the hub 287 by calling into the HCD 210 at step 7. The HCD 210 queues the command to the USB host controller chipset 255. That is, the HCD proxy 215 does not communicate directly with the hardware, but uses the HCD to do so. When the USB control transfer is completed, the HCD 210 sends an appropriate notification to the HCD proxy 215 at step 8. At step 9, the HCD proxy 215 completes the previously queued USB control transfer. In addition, it removes the transfer from the queue 217, as it is no longer pending. When the HCD 210 is notified about the USB control transfer completion, it completes, at step 10, the corresponding request so that the hub device driver 209 is notified about the completion.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. A processor that executes program code for performing the steps of the methods of the invention, as described in FIGS. 3, 4, and 5 and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A method, comprising acts of:

receiving first data associated with a hardware USB device, wherein the first data is generated as a result of program code associated with the USB device being executed outside of a trusted execution environment of a computer, and wherein the first data is received by a host controller driver executing outside of said trusted execution environment;

determining by a host controller driver proxy executing outside of the trusted execution environment if the first data received by said host controller driver should be securely processed in the trusted execution environment of the computer;

wherein when it is determined by the host controller driver proxy that the first data does not need to be securely processed, the host controller driver proxy allowing the host controller driver to proceed with non-secured processing of said first data; and wherein when it is determined by the host controller driver proxy that the first data should be securely processed, the host controller driver proxy:

sending second data associated with the first data to the trusted execution environment for secured processing; and receiving from the trusted execution environment third data associated with the first data resulting from said secured processing by the trusted execution environment.

2. The method of claim 1, wherein the program code associated with the USB device is a part of a device driver for the USB device.

3. The method of claim 2, further comprising:

sending the third data to program code associated with a USB host controller for delivery to the device driver for the USB device.

4. The method of claim 3, wherein the program code associated with the USB host controller is part of a device driver for the USB host controller.

5. The method of claim 1, wherein the first data is a USB transfer request.

6. The method of claim 1, further comprising:

sending the second data to a device driver for a security extension, wherein the device driver for the security extension resides in the trusted execution environment, and wherein the second data comprises a notification to access a buffer associated with the security extension and retrieve data.

7. The method of claim 6, wherein the third data comprises the data retrieved from the buffer.

8. The method of claim 1, wherein the first data is a USB control transfer request.

9. The method of claim 8, further comprising:

sending the second data to a device driver for a security extension, wherein the device driver for the security extension resides in the trusted execution environment, and wherein the second data comprises the USB control transfer request.

10. The method of claim 1, wherein the USB device is a trusted device.

11. The method of claim 10, wherein the USB device becomes a trusted device after the program code associated with the USB device is loaded onto the computer.

12. The method of claim 1, further comprising:

placing the first data in a queue before sending the second data.

13. A tangible computer-readable storage medium having computer-executable instructions that are executable by a computer to cause performance of acts, comprising:

receiving first data associated with a USB device, wherein the first data is generated as a result of program code associated with the USB device being executed outside of a trusted execution environment of a computer, and wherein the first data is received by a host controller driver executing outside of said trusted execution environment;

determining by a host controller driver proxy executing outside of the trusted execution environment if the first data received by said host controller driver should be securely processed in the trusted execution environment of the computer;

wherein when it is determined by the host controller driver proxy that the first data does not need to be securely processed, the host controller driver proxy allowing the host controller driver to proceed with non-secured processing of said first data; and wherein when it is determined by the host controller driver proxy that the first data should be securely processed, the host controller driver proxy:

sending second data associated with the first data to the trusted execution environment for secured processing; and receiving from the trusted execution environment third data associated with the first data resulting from said secured processing by the trusted execution environment.

14. The tangible computer-readable storage medium of claim 13, further comprising computer-executable instructions that are executable by a computer to cause a further act of:

sending the second data to a device driver for a security extension, wherein the device driver for the security extension resides in the trusted execution environment, and wherein the second data comprises a notification to access a buffer associated with the security extension and retrieve data.

15. The tangible computer-readable storage medium of claim 13, further comprising computer-executable instructions that are executable by a computer to cause a further act of:

sending the second data to a device driver for a security extension, wherein the device driver for the security extension resides in the trusted execution environment, and wherein the second data comprises a USB control transfer request.

16. A system comprising a processor, the system comprising:

a trusted execution environment residing on the processor;

a host controller driver associated with a USB host controller, wherein the host controller driver resides outside of the trusted execution environment; and a host controller driver proxy, which resides outside of the trusted execution environment, and which provides an interface between the host controller driver and the trusted execution environment, for:

obtaining first data associated with a USB device, wherein the first data is a result of program code associated with the USB device being executed outside of the trusted execution environment;

determining if the first data should be securely processed;

sending second data associated with the first data to the trusted execution environment for secured processing, if it is determined that the first data should be securely processed; and receiving from the trusted execution environment third data associated with the first data resulting from said secured processing by the trusted execution environment.

17. The system of claim 16, wherein the host controller driver proxy additionally is for:

sending the third data to the host controller driver for delivery to a device driver for the USB device, wherein the program code associated with the USB device is a part of the device driver for the USB device.

18. The system of claim 16, wherein the host controller driver proxy additionally is for:

sending the second data to a device driver for a security extension, wherein the device driver for the security extension resides in the trusted execution environment, and wherein the second data comprises a notification to access a buffer associated with the security extension and retrieve data.

19. The system of claim 16, wherein the host controller driver proxy additionally is for:

sending the second data to a device driver for a security extension, wherein the device driver for the security extension resides in the trusted execution environment, and wherein the second data comprises a USB control transfer request.

* * * * *